United States Patent [19]

Bok et al.

[11] 4,314,264

[45] Feb. 2, 1982

[54] INK SUPPLY SYSTEM FOR AN INK JET PRINTER

[75] Inventors: Dennis E. Bok; Mark E. Brown, both of Dayton; Steven R. Hahn, Centerville; David A. Huliba, Kettering; Thomas M. Wysinski, Dayton, all of Ohio

[73] Assignee: The Mead Corporation, Dayton, Ohio

[21] Appl. No.: 178,325

[22] Filed: Aug. 15, 1980

[51] Int. Cl.³ .................... G01D 15/18

[52] U.S. Cl. .................... 346/140 R; 346/75

[58] Field of Search .................... 346/1, 75, 140 IJ

[56] References Cited

U.S. PATENT DOCUMENTS

| | | | |
|---|---|---|---|
| 3,661,304 | 5/1972 | Martinez et al. | 222/394 |
| 3,761,953 | 9/1973 | Helgeson et al. | 346/140 IJ X |
| 3,839,721 | 10/1974 | Chen et al. | 346/75 |
| 3,891,121 | 6/1975 | Stoneburner | 222/1 |
| 3,930,258 | 12/1975 | Dick et al. | 346/140 IJ X |
| 3,970,222 | 7/1976 | Duffield | 222/148 |
| 3,971,039 | 7/1976 | Takano et al. | 346/140 IJ X |
| 3,974,508 | 8/1976 | Blumenthal | 346/140 |
| 4,042,937 | 8/1977 | Perry et al. | 346/1 |
| 4,050,078 | 9/1977 | Isayama et al. | 346/140 IJ |
| 4,079,384 | 3/1978 | Takano et al. | 346/140 IJ |
| 4,207,582 | 6/1980 | Yamamoto | 346/140 IJ |
| 4,263,602 | 4/1981 | Matsumoto et al. | 346/140 IJ |

OTHER PUBLICATIONS

"Fluid Circuit for Fast Startup of an Inket Jet Head," Sippel et al., IBM Technical Disclosure Bulletin, vol. 17, No. 5, Oct. 1974, p. 1524.

"Fast Liquid Valve", Giordano et al., IBM Technical Disclosure Bulletin, vol. 19, No. 6, Nov. 1976, pp. 2313–2314.

"Ink Jet Head", Pelkie et al., IBM Technical Disclosure Bulletin, vol. 18, No. 10, Mar. 1976, pp. 3206–3207.

*Primary Examiner*—George H. Miller, Jr.

*Attorney, Agent, or Firm*—Biebel, French & Nauman

[57] ABSTRACT

An ink supply system for supplying ink through the print head of an ink jet printer includes a pump arrangement supplying ink to the print head from a supply tank and, further, plural ink return lines connected between the pump outlet and the pump inlet. Each of the ink return lines includes a flow restriction, with the flow restriction in each line providing a fluid flow impedance which differs from the impedances provided by the other flow restrictions. A valve arrangement controls the connection of the pump outlet to a selected one of the ink return lines, such that the flow rate of ink through the ink supply line to the print head is effectively controlled.

19 Claims, 1 Drawing Figure

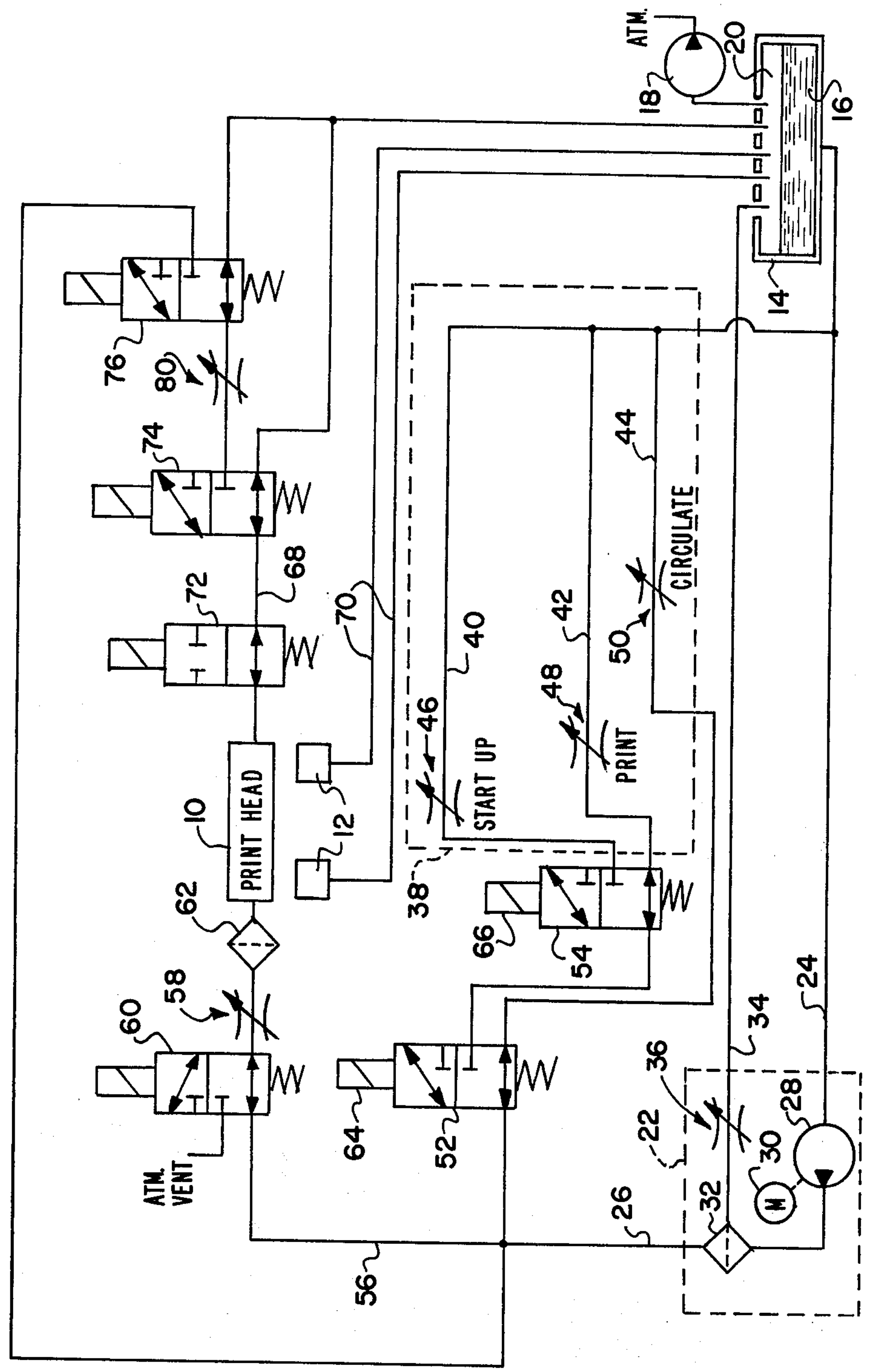
ATM.
20
18
16
14
76
80
74
68
72
70
40
42
44
CIRCULATE
50
48
46
START UP
PRINT
PRINT HEAD
10
12
12
38
66
54
62
58
60
ATM.
VENT
64
52
36
34
24
22
28
30
M
32
26
56

INK SUPPLY SYSTEM FOR AN INK JET PRINTER

BACKGKGROUND OF THE INVENTION

The present invention relates to ink jet printers and, more particularly, to an ink supply system for supplying ink to the print head of such a printer.

A number of different types of ink supply systems have been utilized in the past for supplying ink under pressure to the print head of an ink jet printer. Typically, the print head of an ink jet printer defines a fluid reservoir to which ink is applied and at least one orifice from which a fluid filament emanates. Mechanical disturbances are applied to the fluid filaments, as for example by means of a piezoelectric transducer, to stimulate the filaments to break up into jet drop streams. As drops are formed from the fluid filaments, the drops are selectively charged and, thereafter, are deflected by an electrostatic field such that they are separated into print and catch trajectories. The drops in the print trajectories strike a print receiving medium, such as a paper web, while the drops in the catch trajectories are directed to one or more drop catchers, which ingest the drops and return them to the fluid supply system for reuse. One such prior art printer is shown in U.S. Pat. No. 3,701,998, issued Oct. 31, 1972, to Mathis.

One type of fluid supply system which has been utilized with such ink jet printers is shown in U.S. Pat. No. 3,761,953, issued Sept. 25, 1973, to Helgeson. The Helgeson ink supply system includes a fluid recirculation path from a fluid pump to a pressure regulation tank and back to the pump. Fluid is withdrawn from the pressure regulation tank and supplied to the print head and the ink in the recirculation path is replenished from a supply tank. While providing fluid to the print head at a desired pressure, the flow rate of the ink is not controlled. Additionally, the supply system of Helgeson is relatively complicated and requires a substantial number of components.

A significant problem encountered with ink jet printers is the difficulty of providing a start up of the printer in which the jet drop streams are formed without wetting other printer components. As the flow of ink through the print head orifices begins, the jet drop streams initially established tend to be somewhat unstable, both in trajectory and in drop size. This instability may also reappear at shut down of the printer as the fluid flow through the orifices is terminated.

U.S. Pat. No. 4,042,937, issued Aug. 16, 1975, to Perry et al, discloses an ink supply system in which sequencing of purging, start up, print operation, and shut down of the printer are controlled by a pair of solenoid-actuated valves connected in the inlet and outlet lines of the print head. The inlet valve is connected between a pump and the print head, while the outlet valve is connected between the print head and the supply tank which provides ink to the pump. Start up is accomplished by filling the print head with ink, closing the inlet valve to permit pressure to build behind the inlet valve to a level significantly greater than that required for operation and, thereafter, opening the inlet valve. At shut down, the inlet valve is closed while the outlet valve is held open, thus creating a negative pressure in the head. The Perry et al supply system does not include a provision for controlling the fluid flow rate to the print head but, rather, simply operates with the pump providing whatever flow of ink to the head may result from the opening and closing sequences of the valves.

U.S. Pat. No. 3,661,304, issued May 9, 1972, to Martinez et al, discloses an ink supply system including an arrangement for providing a fluid pressure pulse to the print head to initiate fluid filament formation. The pressure pulse, in one embodiment, is provided by establishing fluid flow through a supply line from a supply tank to a collection tank with the supply line also being connected to the print head. After the fluid flow is established, a valve adjacent the collection tank is abruptly closed, producing a pressue pulse within the supply line which is transmitted to the print head.

U.S. Pat. No. 3,970,222, issued July 20, 1976, to Duffield, discloses an ink jet printer start up method in which ink is supplied under pressure to the print head such that air in the print head becomes compressed. This, in turn, raises the pressure of the ink. Compression of the air continues until the ink reaches the first orifice in a row of orifices, at which time the pressure within the print head is in excess of the required start up pressure. Ink flows through the first orifice and, in succession, through each of the other orifices of the print head. U.S. Pat. No. 3,891,121, issued June 24, 1975, to Stoneburner, discloses a start up method in which the print head manifold is pressurized with air and a flushing liquid prior to supplying ink to the print head.

Another problem encountered with ink jet printers is that air may become trapped within the print head ink reservoir. Air pockets or bubbles in the print head may inhibit proper printer operation due to their compressibility. U.S. Pat. No. 3,974,508, issued Aug. 10, 1976, to Blumenthal, discloses an ink jet printer in which air bubbles are purged from the print head by passing ink from an inlet line through the print head to an outlet line at a relatively high flow rate. This sweeps out air pockets that might otherwise remain in the print head.

Accordingly, it is seen that there is a need for a fluid supply system for an ink jet printer in which the supply of fluid to the print head is controlled in a simple, reliable manner and in which start up, bleeding of air from the print head, printing, and shut down are reliably controlled.

SUMMARY OF THE INVENTION

An ink supply system for supplying ink to the print head of an ink jet printer for production of jet drop streams includes an ink supply tank for storing a quantity of ink and pump means, having a pump inlet and a pump outlet for receiving ink from the ink supply tank at the pump inlet and for providing ink under pressure at the pump outlet. An ink recirculation means includes a plurality of ink return lines for returning ink from the pump outlet to the pump inlet. Each of the ink return lines includes flow restriction means, with the flow restriction means in each line providing a fluid flow impedance therethrough which differs from the fluid flow impedance provided by the flow restriction means in the others of the ink return lines.

A controllable valve means selectively directs ink from the pump means to a selected one of the ink return lines. A print head supply means provides a flow of ink from the pump means to the print head. Solenoid means are provided for controllably actuating the controllable valve means such that a portion of the ink from the pump outlet is returned to the pump inlet through a selected one of the ink return lines, while the remainder of the ink from the pump means is supplied to the print head through the print head supply line means. The fluid flow rate of ink supplied to the print head means is thereby controlled by returning ink from the pump outlet to the pump inlet through a selected flow restriction means.

The ink recirculation means may include three ink return lines. A first of the ink return lines includes a start up flow restriction, a second of the ink return lines includes a print flow restriction means, and a third of the ink return lines includes a circulate flow restriction means. The start up flow restriction means provides a fluid flow impedance therethrough greater than that of the print flow restriction means, while the circulate flow restriction means provides a fluid flow impedance therethrough less than that of the print flow restriction means.

The print head supply line means may include a supply flow restriction means. The ink supply system may further include a print head return line means for returning ink from the print head to the ink supply tank, whereby ink flow through the print head from the print head supply line to the print head return line is controlled by the relative fluid impedance between the supply flow restriction means and the flow restriction means in the ink return lines.

The supply tank may include vacuum pump means for maintaining the quantity of ink within the tank at a subatmospheric pressure to reduce the amount of air in the ink.

The print head supply line means may further include a print head inlet valve for connecting the print head to the pump means or, alternatively, for venting the print head to atmosphere, whereby at shut down the print head may be vented to atmosphere to reduce the ink pressure in the print head, and thereby terminate production of the jet drop streams.

The print head return line means may include a print head outlet valve for permitting ink flow therethrough or, alternatively, for terminating ink flow from the print head through the print head return line means, whereby ink flow through the print head may be rapidly terminated for initiating production of jet drop streams at start up of the printer.

The ink supply system may further include bleed valve means for supplying ink from the pump means to the side of the print head outlet valve opposite the print head prior to bleeding air from the print head. Air is bled from the print head by opening the print head outlet valve to produce fluid flow through the print head. At least a portion of the print head return line means is thereby filled with ink to reduce the pressure drop in the print head which occurs upon opening the print head outlet valve.

The method of supplying ink to the print head of an ink jet printer for producing a plurality of jet drop streams emanating therefrom includes the steps of (a) connecting a first ink return line, including a fixed start up restriction, between the pump inlet and the pump outlet prior to and during start up of the printer and establishment of jet drop streams, and (b) connecting a second ink return line, including a fixed print restriction having a fluid flow impedance less than that of the fixed start up restriction, between the pump inlet and the pump outlet after start up of the printer and prior to printing, whereby a reduced fluid flow to the print head during printing is obtained.

The method may further include the steps of opening the print head inlet and outlet valves to produce ink flow through the print head prior to start up, and closing the print head outlet valve to terminate ink flow through the print head, thereby increasing rapidly the fluid pressure within the print head and initiating formation of the jet drop streams.

The method may further comprise the step of bleeding air from the print head after start up of the printer and after connection of the second ink return line between the pump inlet and the pump outlet. The step of bleeding air from the print head includes the steps of connecting the pump outlet valve to the side of the print head outlet valve opposite the print head so as to fill at least a portion of the print head return line, opening the print head outlet valve, providing an ink bleed path from the print head outlet valve to the ink supply tank through a bleed restriction to establish a bleed ink flow through the print head, and closing the print head outlet valve.

The method may further comprise the step of connecting a third ink return line, including a fixed circulate restriction having a fluid flow impedance less than that of the fixed print restriction, between the pump inlet and the pump outlet to provide a reduced fluid flow to the print head after termination of printing. The method further includes the step of momentarily venting the print head to atmosphere at shut down of the printer to produce a rapid reduction in fluid pressure within the print head and rapid termination of the jet drop streams.

Accordingly, it is an object of the present invention to provide an ink supply system and a method of supplying ink to the print head of an ink jet priner including a pump and a plurality of ink return lines, each including a flow restriction, which lines are selectively connectable between the pump inlet and the pump outlet; to provide such a system and method in which start up is initiated by establishing an ink flow through the print head and thereafter terminating the flow rapidly at the print head outlet; to provide such a system and method in which bleeding of air from the print head may be accomplished after start up of the printer; and to provide such a system and method in which the print head is momentarily vented to atmosphere at shut down of the printer to produce a rapid reduction in the fluid pressure within the print head.

Other objects and advantages of the invention will be apparent from the following description, the accompanying drawings and the appended claims.

BRIEF DESCRIPTION OF THE DRAWING

The FIGURE is a schematic representation of the ink supply system of the present invention.

DETAILED DESCRIPTION OF THE PREFERRED EMBODIMENTS

Reference is made to the single FIGURE which depicts diagrammatically the ink supply system of the present invention. The ink supply system provides ink to the print head 10 of an ink jet printer for production of jet drop streams in a known manner. Print head 10 may be any one of a number of known prior art print heads, such as shown in U.S. Pat. No. 3,701,998, issued Oct. 31, 1972, to Mathis, which produces a plurality of jet drop streams of ink for deposit on a print receiving medium. Drops which are not to be deposited upon the print receiving medium are selectively charged by charging electrodes (not shown) and electrically deflected to one or more drop catchers 12 for reuse by the fluid supply system. The fluid supply system includes an ink supply tank 14 which stores a quantity of ink 16 therein. Supply tank 14 includes vacuum pump 18 which partially evacuates the air space 20 above the ink 16, so as to maintain the ink 16 at a subatmospheric pressure. This tends to reduce foaming of the ink 16 and to remove air bubbles from the ink prior to application of the ink to the print head 10.

A pump means 22, having a pump inlet 24 and a pump outlet 26, receives ink from the ink supply tank 14 at the pump inlet 24 and provides ink under pressure at the pump outlet 26. The pump means 22 includes a pump 28 powered by an electric motor 30. The pump means 22 further includes a filter 32 which is connected to the output of the pump 28 and filters the ink supplied to pump outlet 26. In order to remove any air which may accumulate within the filter 32, a bleed line 34, including a bleed restriction 36, returns to the supply tank 14 a small portion of the ink supplied to the filter 32, as well as any air which may be trapped within the filter 32.

Ink recirculation means 38 includes a plurality of ink return lines 40, 42, and 44 for returning ink from the pump outlet 26 to the pump inlet 24, and each of the ink return lines includes a flow restriction means. The first ink return line includes a start up flow restriction means 46, the second ink return line 42 includes a print flow restriction means 48, and the third ink return line 44 includes a circulate flow restriction means 50. Flow restriction means 46, 48, and 50, each include a manually adjustable valve which provides a fluid flow impedance therethrough. The start up flow restriction means 46 provides a fluid flow impedance therethrough which is greater than that of the print flow restriction means 48, while the circulate flow restriction means 50 provides a fluid flow impedance therethrough less than that of the print flow restriction means 48.

A controllable valve means, including valves 52 and 54 selectively directs ink from the pump means 22 to selected ones of the ink return lines 40, 42, and 44. A print head supply line means 56, including supply flow restriction means 58 and print head inlet valve 60, supplies ink from the pump means 22 to the print head 10. A filter 62 may also be provided in the print head supply line means 56.

Solenoid means 64 and 66 are provided for controllably actuating associated valves 52 and 54, respectively, such that a portion of the ink from the pump outlet 26 is returned to the pump inlet 24 through a selected one of the ink return lines 40, 42, and 44. The remainder of the ink from the pump means 22 is supplied to the print head 10 through the print head supply line means 56. As a consequence, the flow rate of ink supplied to the print head is controlled by selecting an appropriate one of the flow restriction means 46, 48, and 50 through which a portion of the output of the pump means 22 is recirculated to the pump inlet 24. The balance of the ink from the pump outlet 26 is applied to the print head 10. It will be appreciated that when an ink return line having a flow restriction therein which provides a substantial fluid flow impedance is selected, a greater portion of the ink output from the pump means 22 is supplied through the supply line means 56 to the print head than is the case when an ink return line having a lesser impedance flow restriction means is selected.

The supply system further includes a print head return line means 68 for returning ink from the print head 10 to the ink supply tank 14. Additionally, drops of ink which are caught by catchers 12 are returned to the supply tank 14 via lines 70. The print head return line means 68 includes a print head outlet valve 72 which permits ink flow therethrough or, alternatively, terminates ink flow from the print head 10 through the print head return line means 68.

Bleed valve means, including solenoid actuated valves 74 and 76, are provided for supplying ink from the pump means 22 to the side of the print head outlet valve 72 opposite the print head 10 prior to a bleeding operation, described below, in which the outlet valve 72 is opened to permit fluid flow through the print head.

An operational cycle for the ink supply system of the present invention is described in the following Table:

| | VALVE | | | | | | |
|---|---|---|---|---|---|---|---|
| Step No. | 52 | 54 | 60 | 74 | 72 | 76 | DESCRIPTION |
| 1 | 0 | 0 | 0 | 0 | 0 | 0 | Circulate |
| 2 | 1 | 0 | 0 | 0 | 0 | 0 | |
| 3 | 1 | 1 | 0 | 0 | 0 | 0 | |
| 4 | 1 | 1 | 0 | 0 | 1 | 0 | Start Up |
| 5 | 1 | 0 | 0 | 1 | 1 | 1 | |
| 6 | 1 | 0 | 0 | 1 | 0 | 1 | |
| 7 | 1 | 0 | 0 | 1 | 0 | 0 | Bleed |
| 8 | 1 | 0 | 0 | 1 | 1 | 0 | |
| 9 | 1 | 0 | 0 | 0 | 1 | 0 | Print |
| 10 | 1 | 0 | 1 | 0 | 0 | 0 | Shut Down |
| 11 | 0 | 0 | 1 | 0 | 0 | 0 | |
| 12 | 0 | 0 | 0 | 0 | 0 | 0 | Circulate |
| 13 | 0 | 0 | 1 | 0 | 0 | 0 | Bar Removal |

A "1" in the Table indicates that the solenoid associated with the valve is actuated, while a "0" indicates that the solenoid is not actuated.

Initially, as indicated at Step No. 1, the system is in a circulate mode of operation in which print head inlet valve 60 and print head outlet valve 72 are not actuated to produce fluid flow at a relatively low flow rate through the print head from the pump means 22, with the fluid being returned to the tank 14 via the print head return line 68. No jet drop streams are produced by the print head 10 during this mode of operation. Valves 64 and 66 are not actuated at this time and, as a consequence, ink is recirculated through the third ink return line 44 and the circulate flow restriction 50. Since flow restriction 50 offers relatively little impedance to fluid flow through line 44, a substantial portion of the ink from the pump outlet 26 is returned through the ink recirculation means 38 to the pump inlet 24, and the flow rate of ink passing through the print head 10 is therefore relatively low. The supply system may be maintained in the circulate mode for long periods of time without weeping of the ink through the print head orifices because of the relatively low flow rate to the print head 10, and the resulting low fluid pressure of the ink within the print head.

When operation of the printer is to be initiated, it is necessary to establish the flow of fluid filaments from the print head orifices to produce the jet drop streams. As seen in Step No. 2, valve 52 is actuated by solenoid means 64 such that ink is diverted to the second ink return line 42. Shortly thereafter, as seen in Step No. 3, valve 54 is actuated. This results in diverting ink from the pump means 22 through the ink return line 40 and the greater impedance provided by start up flow restriction means 46. The net effect of Step Nos. 2 and 3 is to reduce the flow rate of ink returned to the pump inlet 14 through the ink recirculation means 38, while simultaneously increasing the flow rate of ink supplied to the print head 10 by the print head supply line means 56. The flow rate of the ink through the print head 10 depends in part upon the ratio of the fluid flow impedance between supply flow restriction means 58 and other restrictions in line 56, and the flow restriction means 46, 48, and 50.

After this relatively high flow rate of ink has been established through the print head 10, valve 72 is actuated, as indicated in Step No. 4, thus rapidly terminating the ink flow through the print head. As a consequence, a sudden pressure impulse is imparted to the ink in print head 10, producing a rapid flow of ink through the print head orifices and establishment of the desired jet drop streams.

Once the jet drop streams are established, the flow rate of ink supplied to the print head 10 through the supply line 56 is reduced by deactuating valve 54 as seen in Step No. 5. Valve 72 remains actuated and, therefore, there is no flow out of the print head 10 through the print head return line 68. Further, bleed valves 74 and 76 are actuated such that ink is supplied from the pump outlet 26 to the side of the print head outlet valve 72 opposite the print head 10 through valves 74 and 76 and bleed restriction 80. Actuation of valves 74 and 76 fills a portion of the print head return line 68 which extends between valves 72 and 74. It should be appreciated that previously the entire return line 68 has been drained of ink upon actuation of valve 72 in Step No. 4, since the print head return line 68 terminates above the surface of the ink 16 in supply tank 14.

Next, as seen in Step No. 6, valve 72 is deactuated. No fluid flow through the outlet of the print head 10 occurs at this point, however, since ink from the pump means 22 is supplied to both sides of the print head 10. Subsequently, as shown in Step No. 7, valve 76 is deactuated with the result that a cross-flow of fluid through the print head 10 occurs with ink from the print head supply line means 56 passing through the print head 10, valve 72, valve 74, bleed restriction 80, and ultimately being returned to the supply tank 14. The flow rate of ink passing through print head 10 is further limited by bleed restriction 80. The bleeding operation eliminates any air from the print head 10 which may have accumulated therein.

It is desirable that at least a portion of the print head return line means 68 be filled with ink prior to deactuating valve 72 before the bleed cycle begins in order to limit the amount by which the fluid pressure within the print head 10 drops upon reopening valve 72. Since the flow rate of the ink leaving the print head 10 is limited by bleed restriction 80 and, further, since the print head return line means 68 is filled with ink between the print head 10 and the restriction 80, the drop in pressure within the print head 10 which does occur upon deactuating valve 72 is not sufficiently severe to interfere with the flow of the jet drop streams from the print head 10. If air were to fill the print head return line 68 completely, however, the air within the line 68 would become rapidly compressed upon deactuation of valve 72 and a pressure drop would occur within the print head 10 which have a deleterious effect upon production of the jet drop streams, possibly causing the streams to become unstable and various printer elements to be wetted by the streams.

After bleeding of the print head 10 is completed, the print head outlet valve 72 is once again actuated, terminating flow of ink from the print head to the tank 14 via the print head return line means 68, as illustrated in Step No. 8. Valve 74 is then deactuated, as shown in Step No. 9, and the printer is now operated in a printing mode.

When the printing operation is completed, shut down of the printer is initiated, as seen in Step No. 10, by actuating print head inlet valve 60 and simultaneously, deactuating print head outlet valve 72. The result is that the inlet side of the print head 10 is momentarily vented to atmosphere, while the outlet side of the print head is connected to the evacuated supply tank 14 via the print head return line means 68. The ink within the print head 10 undergoes an extremely rapid drop in pressure and the flow of ink through the print head orifices is quickly terminated, producing a rapid, clean cessation of jet drop stream flow.

Next, as indicated at Step No. 11, valve 52 is deactuated causing the ink supplied to the recirculation means 38 to be routed through the third ink return line 44 and the circulate flow restriction means 50. Finally, print head inlet valve 60 is again deactuated as shown in Step No. 12, resulting in a return to the circulate mode of operation in which ink is passed through the print head 10 at a relatively low flow rate.

For purposes of replacing the print head 10 with another, the print head inlet valve 60 is actuated as shown in Step No. 13. This permits fluid removal in the print head to allow the inlet and outlet lines of the print head to be disconnected and a new print head installed without spillage of fluid onto other hardware.

It will be appreciated that the present invention provides a unique ink supply system in which the start up, bleed, print, and shut down and print head removal operations are effectively controlled. By providing the multiple ink return lines including flow restriction means of varying fluid impedance, the various operations of the printer are controlled in a simple, reliable manner.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An ink supply system for supplying ink to the print head of an ink jet printer for production of jet drop streams, comprising an ink supply tank for storing a quantity of ink, pump means, having a pump inlet and a pump outlet, for receiving ink from said ink supply tank at said pump inlet and for providing ink under pressure at said pump outlet, ink recirculation means including a plurality of ink return lines for returning ink from said pump outlet to said pump inlet, each of said ink return lines including flow restriction means, the flow restriction means in each line providing a fluid flow impedance therethrough which differs from the fluid flow impedance provided by the flow restriction means in the others of said ink return lines, controllable valve means for selectively directing ink from said pump means to a selected one of said ink return lines, print head supply line means for providing flow of ink from said pump means to said print head, and solenoid means for controllably actuating said controllable valve means such that a portion of the ink from said pump outlet is returned to said pump inlet through a selected one of said ink return lines while the remainder of the ink from said pump means is supplied to said print head through said print head supply line means, whereby the fluid flow rate of ink supplied to said print head means is controlled by returning ink from said pump outlet to said pump inlet through a selected flow restriction means.

2. The ink supply system of claim 1 in which said ink recirculation means includes three ink return lines, a first of said ink return lines including start up flow restriction means, a second of said ink return lines including print flow restriction means, and a third of said ink return lines including circulate flow restriction means, said start up flow restriction means providing a fluid flow impedance therethrough greater than that of said print flow restriction means and said circulate flow restriction means providing a fluid flow impedance therethrough less than that of said print flow restriction means.

3. The ink supply system of claim 1 in which said print head supply line means includes a supply flow restriction means, and in which said ink supply system further includes a print head return line means for returning ink from said print head to said ink supply tank, whereby ink flow through said print head from said print head supply line to said print head return line is controlled by the relative fluid impedance between said supply flow retriction means and said flow restriction means in said ink return lines.

4. The ink supply system of claim 1 in which said supply tank includes vacuum pump means for maintaining said quantity of ink within said tank at a subatmospheric pressure to reduce the amount of air in said quantity of ink.

5. The ink supply system of claim 3 in which said print head supply line means further includes a print head inlet valve for connecting said print head to said pump means or, alternatively, for venting said print head to atmosphere, whereby at shut down said print head may be vented to atmospheric pressure at shut down of said printer to reduce the ink pressure in said print head and thereby terminate production of said jet drop streams.

6. The ink supply system of claim 3 in which said print head return line means includes a print head outlet valve for permitting ink flow therethrough or, alternatively, for terminating ink flow from said print head through said print head return line means, whereby ink flow through said print head may be rapidly terminated for initiating production of jet drop streams at start up of said printer.

7. The ink supply system of claim 6 further comprising bleed valve means for supplying ink from said pump means to the side of said print head outlet valve opposite said print head prior to bleeding air from said print head by opening said print head outlet valve to produce fluid flow through said print head, whereby at least a portion of said print head return line means is filled with ink to reduce the pressure drop in said print head upon opening said print head outlet valve.

8. A method of supplying ink to the print head of a printer for producing a plurality of jet drop streams emanating therefrom, said printer including a print head supply line to the print head including a print head inlet valve, a print head return line from the print head to an ink supply tank including a print head outlet valve, and a pump having a pump outlet connected to said print head supply line and a pump inlet connected to said ink supply tank, comprising the steps of connecting a first ink return line, including a fixed start up restriction, between said pump inlet and said pump outlet prior to and during start up of said printer and establishment of said jet drop streams, and connecting a second ink return line, including a fixed print restriction having a fluid flow impedance less than that of said fixed start up restriction, between said pump inlet and said pump outlet after start up of said printer and prior to printing, whereby a reduced fluid flow to said print heading during printing is obtained.

9. The method of claim 8 further comprising the steps of:

opening said print head inlet and outlet valves to produce ink flow through said print head prior to start-up, and closing said print head outlet vlave to terminate ink flow through said print head thereby increasing rapidly the fluid pressure within said print head and initiating flow of said jet drop streams.

10. The method of claim 9 further comprising the step of bleeding air from said print head after start up of said printer and after connection of said second ink return line between said pump inlet and said pump outlet.

11. The method of claim 10 in which the step of bleeding air from said print head comprises the steps of connecting said pump outlet to the side of said print head outlet valve opposite said print head so as to fill at least a portion of said print head return line, opening said print head outlet valve, providing an ink bleed path from said print head outlet valve to said ink supply tank through a bleed restriction, whereby bleed ink flow through said print head is established, and closing said print head outlet valve.

12. The method of claim 8 comprising the further step of connecting a third ink return line, including a fixed circulate restriction having a fluid flow impedance less than that of said fixed print restriction, between said pump inlet and said pump outlet after termination of printing to provide a reduced fluid flow to said print head.

13. The method of claim 12 further comprising the step of momentarily venting said print head to atmosphere at shut down of said printer to produce a rapid reduction in fluid pressure within said print head and rapid termination of said jet drop streams.

14. A method of controlling the flow of ink to an ink jet print head in an ink jet printer, said printer including an ink supply tank, a pump receiving ink from said tank at a pump inlet and providing ink under pressure at a pump outlet, and a print head supply line connecting said print head and said pump outlet, comprising the steps of providing a plurality of ink return lines from said pump outlet to said pump inlet, each of said return lines including a flow restriction providing an impedance to fluid flow therethrough, with the impedance of each flow restriction differing from that of the other flow restrictions, and sequentially connecting selected ones of said ink return lines to provide fluid flow between said pump inlet and said pump outlet, whereby a portion of the ink from said pump outlet is returned to said pump inlet and the balance of the ink from said pump outlet is supplied to said print head through said print head supply line.

15. In an ink supply system for an ink jet print head comprising a delivery line for delivering ink to said print head, ink supply means for supplying ink under pressure to said delivery line and recirculation means connected to said delivery line for recirculating a portion of said ink without passage through said print head; the improvement wherein said recirculation means comprises:

a plurality of return lines connected to said delivery line, valve means for selectively directing ink from said delivery line into said return lines, and control means for controlling said valve means to direct ink into different ones of said return lines in accordance with the operating mode of said print head.

16. Apparatus according to claim 15 wherein said recirculation means comprises flow restriction means within each of said return lines.

17. Apparatus according to claim 16 wherein the flow restriction means in each said return line provides a fluid flow impedance which is different from that of the flow restriction means in each of the other of said return lines.

18. Apparatus according to claim 17 wherein said supply means comprises a pump having its outlet connected for supplying ink to said delivery line, an ink supply tank for supplying ink to the inlet side of said pump, and vacuum means for maintaining the ink in said supply tank at subatmospheric pressure.

19. Apparatus according to claim 18 wherein said return lines are connected for recirculating ink into the inlet side of said pump.

* * * * *